US005844789A

United States Patent [19]
Wynn

[11] Patent Number: 5,844,789
[45] Date of Patent: Dec. 1, 1998

[54] IMPEDENCE REGULATOR TO BLOCK POWER LINE INTERFERENCE

[75] Inventor: Woodson Dale Wynn, Basking Ridge, N.J.

[73] Assignee: AT&T Corp, Middletown, N.J.

[21] Appl. No.: 929,250

[22] Filed: Sep. 10, 1997

[51] Int. Cl.[6] .............................. H02J 1/02; H02M 1/12
[52] U.S. Cl. ........................ 363/39; 340/310.07
[58] Field of Search ................................ 363/39; 315/85; 361/159; 340/310.03, 310.07; 327/594

[56] References Cited

U.S. PATENT DOCUMENTS

| | | | |
|---|---|---|---|
| 4,130,861 | 12/1978 | LaForest | 363/39 |
| 4,199,989 | 4/1980 | Forard et al. | |
| 4,311,964 | 1/1982 | Boykin | |
| 4,355,352 | 10/1982 | Bloom et al. | 363/39 |
| 4,479,215 | 10/1984 | Baker | |
| 4,510,611 | 4/1985 | Dougherty | |
| 5,210,519 | 5/1993 | Moore | 340/310.07 |
| 5,257,006 | 10/1993 | Graham et al. | |
| 5,391,932 | 2/1995 | Small et al. | |
| 5,499,178 | 3/1996 | Mohan | 363/39 |
| 5,568,371 | 10/1996 | Pitel et al. | 363/39 |
| 5,742,103 | 4/1998 | Ashok | 363/39 |

OTHER PUBLICATIONS

"Power–Line Carrier Systems", Authors:T.M. Swingle & H.I. Dobson, Chapter 14, pp. 14–19.

"A Model For Communication Signal Propogation On Three Phase Power Distribution Lines", Authors:M.E. Hardy, S. Ardlan, J.B. O'Neal, Jr., L.J. Gale & K.C. Shuey, IEEE Transactions on Power Delivery, vol. 6, No. 3, Jul. 1991, pp. 966–972.

"Decoupling Networks For Promoting Power Line Carrier Systems"; Author: K.S. Murthy; IEEE Transactions on Power Delivery, vol. 10, No. 2, Apr. 1995, pp. 580–587.

"Power Line Noise Survey", Author: A. A. Smith, Jr., IEEE Transactions On Electromagnetic Compatibility, vol. T–EMC, Feb. 1972, pp. 31–32.

"Transmission Lines and Waveguides"; Author: R.V. Lowman, of book; Chapter 42, pp. 42–1 –42–6.

"Coupled Transmission Line Networks in an Inhomogeneous Dielectric Medium"; Authors: G.I. Zysman & A.K. Johnson, IEEE Transactions on Microwave Theory and Techniques, vol. MTT–17, No. 10, Oct. 1969, pp. 753–759.

"IEEE Guide for Power–Line Carrier Applications", Institute of Electrical and Electronics Engineers, NY, NY, Committee of IEEE Power Eng. Society; Sponser: Power System Communications, IEEE Standard 643–1980, Jan. 30, 1981, ANSI, pp. 2–63.

*Primary Examiner*—Stuart N. Hecker

[57] ABSTRACT

An impedance regulator system and method which offers a large effective high-frequency block to isolate RF signals transmitted on power lines is presented. High-current inductors in series are inductively coupled over the RF band to physically smaller, low-current coupling inductors. The coupling inductors induce a degenerative or canceling at RF frequencies in the high-current inductors, resulting in the effective inductor increase and hence higher impedance over the RF band.

18 Claims, 2 Drawing Sheets ns on the power-line drop to the homes or other power destinations.

IMPEDENCE REGULATOR TO BLOCK POWER LINE INTERFERENCE

BACKGROUND OF THE INVENTION

1. Field of Invention

The invention relates to electrical regulators, and particularly to an impedance regulator which blocks high-frequency interference from homes and other power destinations from interfering with RF signal transmission on the power-line drop to the homes or other power destinations.

2. Description of Related Art

The modern home may be wired to receive high-frequency information content over the power lines to the home from transformer sources. This may be the case for ISDN connections installed without having to use copper trunks or without having to obtain an FCC fixed wireless license. There are however complications in doing this, since the RF impedance variations presented by the house load are unpredictable and time-variable. Also, house-generated noise on the power-line drops in the RF bands of interest can be intense and time-dependent.

To isolate the house impedance variations and house noise from a power line drop to the house to be used as a transmission line for RF signals, it is known in the art to insert high-current inductors in series in the power line at the interface point of the outside power-line drop cables and the house. This type of house block, 120 illustrated in FIG. 1, represents a conventional attempt to isolate the power line drop 100 for RF signals from house impedance variations and noise. The approach relies upon the series inductance in the power line and a shunt capacitor across the power lines from power mains to neutral, at the house termination of the line drop 100.

However, these blocking techniques have the practical problem that the passive blocking inductors must be of large diameter wire, in order to conduct typical house currents which are in the range of 100 amps rms. This translates to at least 0.25 inch diameter copper wire, and a larger wire if aluminum is used. Even using a low-$\mu$ ferrite material as a core for such passive coils will not yield an inductance of more than a few $\mu$Henries for any inductor of useful size, without saturation of the ferrite at a peak current of $\pm\sqrt{2}\cdot 100$ amps.

A further problem with the realization of such conventional blocking devices is the appearance of self-resonant frequencies. If coil turns are closely spaced and multiple coil layers are attempted to increase the inductance of coils in a small physical size, the self-resonant frequency decreases into the frequency range desired for the signal block itself. This undesired effect is present with air core or ferrite core coils of compact size.

SUMMARY OF THE INVENTION

The invention overcoming these and other problems in the prior art relates to a regulator employing an active circuit to present an efficient, high-frequency block to incoming power mains, while maintaining a relatively physically small size and good resonant frequency control. The regulator of the invention effectively presents a degenerative RF circuit path to the incoming power line, with the effect of increasing the inductor impedance and reducing house generated RF noise components on the power line drop. The regulator in the invention makes the impedance of the power line inductance look very large to RF frequencies while not affecting the low frequency house current flow through the inductor.

DETAILED DESCRIPTION OF PREFERRED EMBODIMENTS

Figure 1:
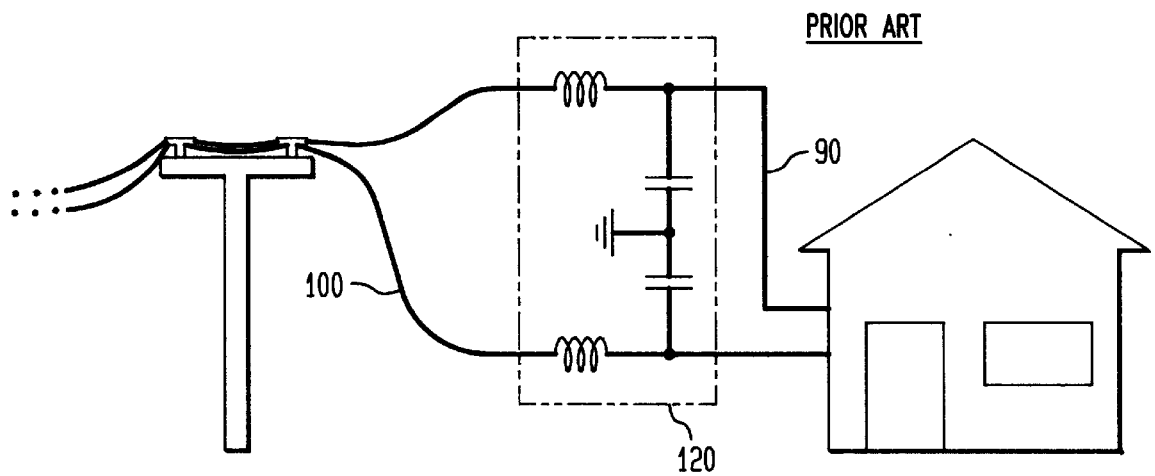
FIG. 1 illustrates a high-frequency current blocking inductor of conventional passive design.
Figure 2:
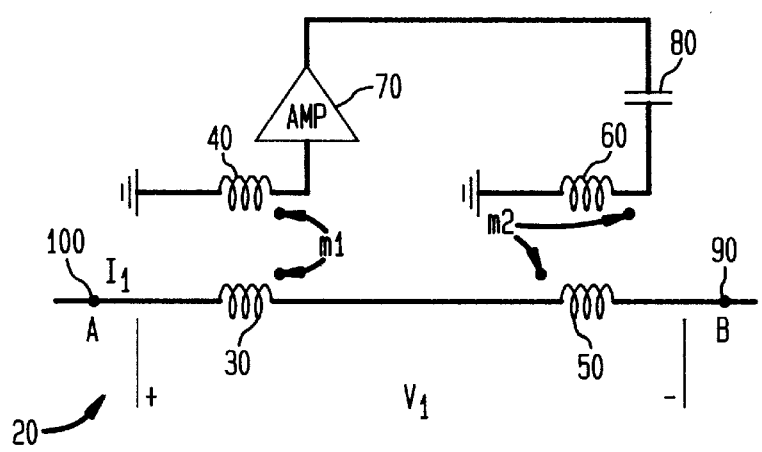
FIG. 2 illustrates an impedance regulator for high-frequency blocking according to an illustrative embodiment of the invention.

As illustrated in FIG. 2, the active regulator 20 of the invention contains a set of components which cooperate to reduce house generated noise on the power line drop from the street transformer to a home or other destination. The regulator also isolates house impedance fluctuations from the line drop by presenting a large impedance termination that can be shunted on the line drop side at the house by a controlled impedance termination for the RF transmission path.

In the regulator of the invention according to the illustrative embodiment, a pair of high-current inductors 30 and 50 are placed in series in the house power line 90 (with connections to inside wiring etc.) connected to the outside power grid (also called the line drop) 100. First high-current inductor 30 and second high-current inductor 50 have a wire size large enough to carry the typical 100 amp rms supply, as understood by persons skilled in the art. Inductors 30 and 50 may be constructed with an air core, or alternatively with ferrite cores as long as the maximum house current does not cause core saturation which would give rise to RF signal intermodulation components. The high-current inductors 30 and 50 are not assumed to be magnetically coupled, but the invention could be constructed where this coupling does exist.

To achieve noise reduction, the invention also provides a pair of coupling inductors 40 and 60 which are magnetically coupled to the high-current inductors 30 and 50, respectively. High-current inductor 30 is coupled to first regulating inductor 40 with mutual coupling coefficient $m_1$, and high-current inductor 50 is coupled to second regulating inductor 60 with coupling coefficient $m_2$. High-current inductor 30 couples the signal to inductor 40, which is then amplified by amplifier 70 connected in series between inductors 40 and 60. The resulting voltage developed across second inductor 60 is therefore an amplified version of the voltage across inductor 30. The voltage across inductor 30 that is coupled to inductor 40 itself is created by the supply current $I_1$ flowing through conductor 30.

Since one objective of the invention is to efficiently transmit low-frequency power signals at 60 Hz, a high-pass filter formed by capacitor 80 is connected in series with inductor 60, to attenuate the low-frequency components present in the regulating feedback signal.

Consequently, a voltage is induced in inductor 50 by the reverse coupling (via $m_2$) of inductor 60 to inductor 50. The voltage induced in inductor 50 creates a counter-acting (or bucking or degenerative) current to that flowing through inductor 30. The effect of this counter-acting current regulation is to reduce the current $I_1$ for a given voltage $V_1$ across the series combination of inductors 30 and 50, relative to the current that would otherwise flow in the series connection in response to voltage $V_1$ if inductive degeneration was not used.

Figure 3:
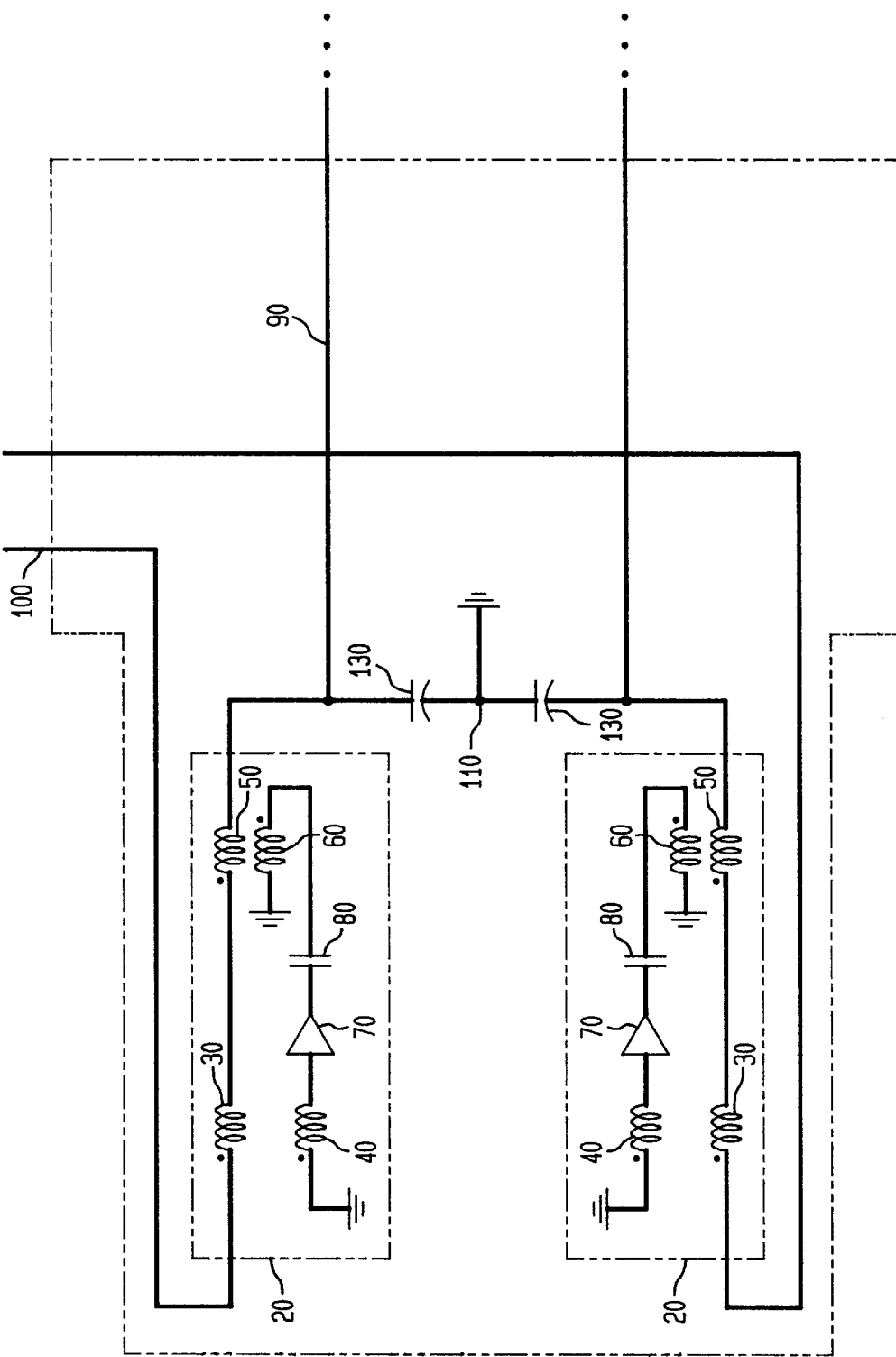
FIG. 3 illustrates a home wiring configuration in which the impedance regulator of the invention is illustratively employed.

Thus, the regulator 20 of the invention has the effect of making the apparent inductance of the series connection of inductors 30 and 50 appear larger than the passive value that would be presented to the RF signal band. Blocking capacitor 80 prevents regulation at low frequencies such as 60 Hz house current. As illustrated in FIG. 3, in a typical home installation a pair of impedance regulators 20 according to the invention are provided in balanced fashion, with undesired high frequency components shunted to ground point 110 through capacitors 130. The pair of impedance regulators of FIG. 3 are preferably enclosed in a glass or other non-magnetic enclosure. Other numbers and configurations of the impedance regulator 20 could be used.

Advantageously in the construction of the invention, the physical size of the overall impedance regulator 20 is primarily determined by the necessary coil sizes of high-current inductors 30 and 50. Coupling inductors 40 and 60 do not add much physical bulk to the impedance regulator 20 since these two devices can be made of very small-diameter wire, as they only need carry higher-frequency RF signal currents, and not the 100-amp low-level house current. Thus, the effective inductance seen by RF signals can be much larger than with the passive inductance offered by the series connection of high-current inductors 30 and 50 without degenerative feedback, while maintaining about the same physical size as the high-current inductors 30 and 50 alone.

The foregoing description of the impedance regulator system and method of the invention is illustrative, and variations in configuration and construction will occur to persons skilled in the art. The scope of the invention is accordingly intended to be limited only by the following claims.

What is claimed is:

1. An impedance regulator, comprising:
   a first inductive element connected between a power supply and a power sink; and
   a second inductive element, inductively coupled to the first inductive element, which degeneratively couples to the first inductive element to reduce undesired RF noise components on one side of the regulator relative to the noise level on the other side of the regulator.

2. The impedance regulator according to claim 1, wherein,
   the first inductive element comprises a pair of high-current inductors connected in series, and
   the second inductive element comprises a pair of inductors, each coupling to a corresponding one of the high-current inductors to degeneratively couple a high-frequency component to the high-current inductors, reducing the high-frequency-current component in the high-current inductors.

3. The impedance regulator according to claim 2, further comprising an amplifier connected in series between the pair of coupling inductors.

4. The impedance regulator according to claim 3, further comprising a high frequency-pass element connected in series with the amplifier.

5. The impedance regulator according to claim 4, wherein the high frequency-pass element is a capacitor.

6. The impedance regulator according to claim 5, wherein the power supply is a 60 Hz power signal.

7. The impedance regulator according to claim 6, wherein the first and second inductors comprise air core coils.

8. The impedance regulator according to claim 7, wherein the first and second inductive elements comprise ferrite core coils.

9. The impedance regulator according to claim 8, wherein the effective impedance presented by the impedance regulator is increased at RF frequencies.

10. A method of regulating impedance, comprising the steps of:
    providing a first inductive element connected between a power supply and a power sink; and
    providing a second inductive element, inductively coupled to the first inductive element, which degeneratively couples to the first inductive element to reduce undesired RF frequency components on the power supply current side that arise in the power sink.

11. The method according to claim 10, wherein,
    the step of providing a first inductive element comprises the step of providing a pair of high-current inductors connected in series, and
    the step of providing a second inductive element comprises the step of providing a pair of coupling inductors, each coupling to a corresponding one of the high-current inductors to degeneratively couple a high-frequency component to the high-current inductors, reducing the high-frequency component of current in the first inductive element.

12. The method according to claim 11, wherein the step of providing the second inductive element comprises the step of providing an amplifier connected in series between the pair of coupling inductors.

13. The method according to claim 12, wherein the step of providing a second inductive element further comprises the step of providing a high frequency-pass element connected in series with the amplifier.

14. The method according to claim 13, wherein the high frequency-pass element is a capacitor.

15. The method according to claim 14, wherein the power supply is a 60 Hz power signal.

16. The method according to claim 15, wherein the first and second inductors comprise air core coils.

17. The method according to claim 16, wherein the first and second inductive elements comprise ferrite core coils.

18. The method according to claim 17, wherein the effective impedance provided by the impedance regulation is increased at RF frequencies.

\* \* \* \* \*